United States Patent [19]

Riester

[11] 3,754,921
[45] Aug. 28, 1973

[54] PHOTOGRAPHIC LAYER CONTAINING A LIGHT-SENSITIVE LEUCOPHTHALOCYANINE SENSITIZED WITH A PHENYL BORANATE

[75] Inventor: Oskar Riester, Leverkusen, Germany

[73] Assignee: AGFA-Gevaert Aktiengesellschaft, Leverkusen, Germany

[22] Filed: Sept. 22, 1971

[21] Appl. No.: 182,920

[30] Foreign Application Priority Data
Sept. 25, 1970 Germany.................. P 20 47 250.8

[52] U.S. Cl. ..................................... 96/90 R, 96/88
[51] Int. Cl. ............................................ G03c 1/52
[58] Field of Search............ 260/314.5; 96/90, 96/88

[56] References Cited
UNITED STATES PATENTS
2,915,392  12/1959  Pedersen............................. 96/90 X
3,121,012  2/1964   Agruss.................................... 96/90

FOREIGN PATENTS OR APPLICATIONS
932,533  9/1955  Germany............................. 96/107

Primary Examiner—Norman G. Torchin
Assistant Examiner—Won H. Louie, Jr.
Attorney—Arthur G. Connolly, Albert F. Bower et al.

[57] ABSTRACT

Photographic dye images are produced by imagewise exposure of a light sensitive layer containing a leucophthalocyanine and a phenylboranate.

4 Claims, No Drawings

PHOTOGRAPHIC LAYER CONTAINING A LIGHT-SENSITIVE LEUCOPHTHALOCYANINE SENSITIZED WITH A PHENYL BORANATE

The present invention relates to light-sensitive materials which contain, as light-sensitive material a mixture of, leucophthalocyanines and phenyl boranates which is converted into dark-colored substances upon exposure to actinic light.

Numerous processes are known in which light-sensitive organic substances are used for producing images. Some of these processes are based on photochemical rearrangements or reactions of organic compounds, which result in a color change. A comprehensive description of such photochemical reactions of organic compounds may be found e.g. in "Praparative organische Photochemie" (A. SCHONBERG, Springer-Verlag, 1958) and in "Light-sensitive System" (J. KOSAR, John Wiley and Sons, New York 1965).

One such reaction consists in the formation of monomethine dyes involving the photolysis of trihalomethyl compounds in UV light in the presence of aromatic or heterocyclic compounds which, by virtue of their constitution, have CH ring members highly reactive in condensation or diazo coupling reactions.

The systems hitherto known have limited practical use because their sensitivity to light is generally too low. A certain improvement in sensitivity is obtained with light-sensitive materials containing cyclic imides or aryl polycarboxylic acids in which the imide nitrogen is substituted with olefinically unsaturated linear or cyclic aliphatic groups.

Even the last mentioned substances do not quite satisfy the practical requirements as regards sensitivity to light.

It is among the objects of the invention to provide light-sensitive materials which are free from silver halide and which have sufficient sensitivity to light and produce sufficiently deeply colored reaction products.

We now have found that photographic materials which contain a light-sensitive combination of phenyl boranates and leucophthalocyanines are suitable for the production of images.

Particularly suitable are phneyl boranates characterized by the following formulae:

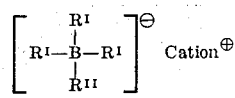

wherein
R$^I$ = aryl such as phenyl or naphthyl, in particular a radical of the phenyl series; these aryls may be linked together and may contain further substituents, e.g. alkyl which preferably has up to five C atoms, halogen such as chlorine or bromine, hydroxyl, alkoxy, carboxyl, esterified carboxyl, nitro, nitrile, carbamoyl, sulfonic acid, sulfonamide or sulfonic acid ester groups, R$^{II}$ = nitrile or R$^I$.

The nature of the cation is not critical. It is mainly determined by the nature of the method used for preparing the boranate. The anions used may be e.g. halogen ions, in particular chloride or bromide ions, sulfate ions, sulfonic acid ions such as toluenesulfonic acid ions, sulfonate ions, e.g. methylsulfonate ions.

Suitable cations are hydrogen or cations of the alkali metals, depending on the pH of the solution of the mixture of components or of the light sensitive layer. Cations of the alkaline earth metals or ammonium ions, optionally carrying organic substituents, may of course also be used.

The following, for example, are suitable:

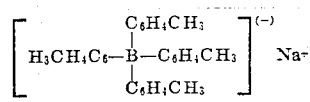

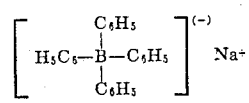

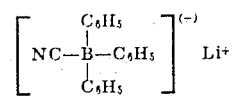

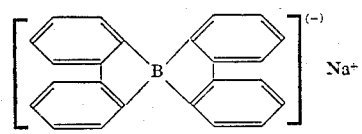

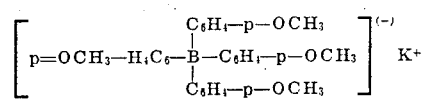

The above compounds are prepared by known methods, see e.g. the publication by G. WITTIG, Ann, 563 (1949) page 114.

The meaning given to the term "Leucophthalocyanines" in the literature is not consistent. Leuco-phthalocyanines which cannot be prepared from finished phthalocyanines may also be termed phthalocyanine precursors. This expression is used e.g. in the article by B.R.A. BROCKS, J.C. BURT, B.F. SKILES and M.S. WHELEN, J.Org.Chem. 24, page 383 (1959). In the relevent chapter in "Ullmanns Enzyklopadie der technischen Chemie," 3rd Edition, Volume 13, the term "Phthalocyanometal complexes" is used for the same types of substances for which the term "leucophthalocyanines" is used in this application. The last-mentioned expression has been explained e.g. in U.S. Pat. No. 2,772,285. Although that patent only refers to leuco copper phthalocyanine, its explanation, it is equally applicable to the corresponding complexes with other metals which form phthalocyanines.

According to the present definition, leucophthalocyanines are colorless or only slightly colored products in which the phthalocyanine structure is completely formed and which may be converted into phthalocyanines by a reduction process. In the course of this reduction process, constituents other than those of the phthalocyanine structure may be split off. These leucophthalocyanines may be prepared e.g. by first preparing a phthalocyanine, e.g. a phthalocyanine which is free from metal or CuPc (Pc = phthalocyanine), NiPc, CoPc or ZnPc and then providing this phthalocyanine with additional ligands under oxidizing conditions, or by heating a reaction mixture which is suitable for the production of a phthalocyanine to a temperature slightly below that required for the production of the phthalocyanine, or by eliminating the reduction potential required for formation of the phthalocyanine.

There have also be described combined processes in which the same reaction mixture ot the leuco stage. Alternatively, a complex forming metal atom may be subsequently introduced into a leucophthalocyanine which is free from metal, or a leucophthalocyanine which contains metal may be prepared from a phthalocyanine which is free from metal. Leucophthalocyanines may also be altered in their structure or solubility by aftertreatment without thus altering their essential property of being able to be converted into a phthalocyanine by reduction. In principle, any leucophthalocyanines, regardless of their method of preparation, may be used for the copying process described here.

Leucophthalocyanines which contain metal are particularly suitable because those which are free from metal are relatively unstable. Cobalt leucophthalocyanines are particularly advantageous because these compounds are only slightly colored, in contrast, for example, to copper or nickel leucophthalocyanines, which have a yellowish or brownish color.

Leuco cobalt phthalocyanines of the type "Phthalogenblau IB" Farbenfabriken Bayer AG which has been described in "Zeitschrift fur Angewandte Chemie," 68, page 145 (1956) and which is regarded as a phthalocyanine-cobalt-ethylenediamine complex, should be especially mentioned in this connection. Instead of ethylene diamine, other dimaines or polyamines may be incorporated as ligands, e.g. propylene-1,2-diamine and propylene-1,3-diamine, monoethylpropylene-1,3-diamine, hydroxy-ethylethylenediamine, N-methyl-N-β-hydroxyethylpropylene diamine, N,N-diethyl-ethylenediamine, N,N-di-(β-aminoethyl)-ethylene-diamine, N,N'-di-(β-aminoethyl)-ethylenediamine, N,N-di-(β-[β-aminoethyl]-aminoethyl)-amine or monoamines such as 3-(2'-ethylhexyloxy)-propylamine-(1) or stearylamine. The solubility properties of the corresponding leuco-CoPc depends on the nature of the amine which has been incorporated.

The leucophthalocyanines and phenylboranates may be present in any proportion in the light-sensitive material. The most advantageous proportion by weight can be determined by a few simple tests. It has generally been found advantageous to add the phenylboranate in a certain excess so that the layer contains the leucophthalocyanine and the phenylboranate in a proportion of 1:1 to 1:2.

The known low sensitivity to light of leucophthalocyanines is increased by several times by the combination according to the invention. The light-sensitive layers according to the invention are easily prepared by dissolving the leucophthalocyanines and phenylboranates either separately or together and applying them to a suitable layer support, with or without a binder.

The substances are applied by known methods, by application or spraying of solutions or by casting solutions or suspensions with layer forming natural colloids or synthetic resins. Suitable binders for this purpose are gelatine, polyvinyl-pyrrolidone, agar-agar, cellulose, cellulose esters, cellulose ethers, polycarbonates, especially of bis-phenylol-alkanes, polyesters, especially polytheylene-terephthalate, polyamides, polyurethanes, and various film-forming copolymers of olefinically unsaturated monomers such as vinyl chloride, vinyl acetate or styrene, olefinically unsaturated carboxylic acids, their esters or others derivatives, e.g. maleic acid anhydride, acrylic acid or methacrylic acid and their derivatives, polyethylene or polyvinylidene chloride.

The leucophthalocyanines and phenylboranates may also be arranged in separate layers in contact with each other.

The usual materials may be used for the layer supports, e.g. paper, glass, or natural or synthetic materials such as cellulose esters, in particular cellulose acetate or cellulose acetobutyrates, polyesters, especially polyethylene tetrephthalate, polycarbonates, especially of bis-phenylolalkanes, polystyrenes or the like. The layer supports may be transparent or contain pigments such as titanium dioxide, barium sulfate etc. The surface of the layer support may be smooth or profiled.

The substances to be used according to the invention may, of course, be added directly to the layer support. If the layer support is made of paper, for example, it is sufficient simply to bathe the support material in a solution of the light-sensitive components.

The compounds to be used according to the invention may also be used in self-supporting layers. Layer binders of the type mentioned above are also suitable for this purpose. The layer binder used is, in principle, not critical and a suitable choice can easily be made from the wide range of known natural or synthetic hydrophilic or hydrophobic layer binding agents by simple tests.

Suitable solvents for the compounds to be used according to the invention are e.g. water, short chained aliphatic alcohols such as methanol or ethanol, acetone, dimethylformamide or the like. Application from aqueous solutions is, of course, preferred. Wetting agents such as saponin are advantageously added to the solution or, in the case of gelatin solutions, the usual hardeners such as formaldehyde, mucochloric acid or the like.

The image tone of the resulting images can to a certain extent be directed in the desired manner by the addition of hydroxyl substituted aromatic compounds, in particular those of the phenyl series such as hydroquinone or paramethylaminophenol.

The concentration of the substances in the binder may be varied within any limits. The gradation and maximum density can be affected by varying the concentration and the amount applied. If the binders used are the type which swell in water, e.g. gelatin, the pH may be varied within those limits in which excessive alteration of the binder such as degradation of gelatin, does not yet take place. The light-sensitive substances are advantageously used in quantities of 1 to 80 percent, based on the dry layer, and yield completely light-fast colored products on exposure to light.

The photographic images obtained in this way can be fixed by rendering the compounds insensitive to light in those areas of the layer which have not been exposed. This may be achieved e.g. by means of reagents which react with one of the components to form stable, colorless products. Separation of the exposed and unexposed parts of the layer may also be acheived by selectively dissolving out one of the components with suitable solvents.

In the present case, the layers in the unexposed areas may be rendered insensitive to light simply by washing out the light-sensitive components with water. This washing out process can be accelerated by the addition of organic or inorganic bases to the washing solution. Suitable bases are e.g. alkali metal or alkaline earth metal hydroxides or carbonates, ammonia, amine, etc.

The unexposed layers of the present invention are pale to light yellow. They are sensitive to UV light, including the longer wave region of UV light, so that in principle they may be exposed with ordinary artificial light. It is particularly advantageous to use nitraphot lamps, neon tubes or laser light. The exposure time depends, of course, on the intensity of the source of light, the distance of the layer from the source and the sensitivity of the layer. Exposure times of a few seconds to several minutes are generally sufficient. The following Examples illustrate the invention:

EXAMPLE 1

A solution of 0.2 g of a leuco-CoPc, the preparation of which is described at the end of this example, in 100 ml of dimethylformamide and 1 ml of 40 percent aqueous citric acid solution is stirred into 30 ml of 10 percent aqueous gelatin solution. A solution of 0.5 g of sodium tetraphenylboranate in a mixture of 10 ml of water with 20 ml of 10 percent aqueous gelatin solution and 10 ml of 10 percent aqueous polyvinyl pyrrolidine solution and 1.5 ml of 7.5 percent aqueous solution of saponin is poured in with stirring.

The combined solution is applied to baryta paper and dried. The light yellow layer is colored dark green within 3 minutes when exposed to a 500 Watt nitraphot lamp.

The same solution may be cast on glass (10.8 ml on 9×12 cm). A suitable light-sensitive layer is obtained on drying. It is colored dark green on image-wise exposure to light.

Preparation of Leuco-CoPc 50 g of a crude product prepared according to Example 1 of German Patent Specification 855,710 were converted into the nitrate by treatment with concentrated nitric acid as described in German Patent Specification 839,939. 16 g of the dry nitrate were boiled in 50 ml of cleaning petrol with 15 g of stearylamine for 20 minutes, the mixture was diluted with 750 ml of cleaning petrol, the resulting solution was filtered at 100°C and stirred in the cold for several hours and the product which crystallized was removed by suction filtration and dried. The resulting reaction product, of which 27 g were obtained, was dissolved in boiling ethanol, the solution was stirred in the cold and the crystals produced were removed by suction filtration and dried. 12 g of an orange colored substance are obtained.

The product described above is converted into the leuco-CoPc in accordance with Example 1 of German Patent Specification 940,164.

EXAMPLE 2

0.5 g of the leuco-CoPc described in Example 1 are dissolved hot in 10 ml of methanol and 0.5 ml of 40 percent aqueous citric acid solution. This solution is added with vigorous stirring to a mixture of 20 ml of 10 percent aqueous gelatin solution and 10 ml of 10 percent aqueous polyvinylpyrrolidine solution (solution a). A solution of 1 g of sodium tetraphenylboranate in 10 ml of water is mixed with 30 ml of 10 percent aqueous gelatin solution (solution b). Solution a) is stirred into solution b), 0.2 ml of saponin (10 percent in water) is added and the mixture is made up to 100 ml with water.

A cellulose triacetate foil is coated with this pale yellow solution. After the usual exposure to light, a blue-green image with a very high contrast is obtained.

EXAMPLE 3

0.5 g of the leuco-CoPc described in Example 1 are dissolved in 10 ml of dimethylformamide and 1 ml of 10 percent aqueous citric acid. This solution is added to a mixture of 30 ml of 10 percent aqueous gelatin solution and 10 ml of 10 percent aqueous polyvinylpyrrolidone solution. The pH is 4.0. This combined solution is run into a solution of 1 g of Na-tetraphenylboranate in 10 ml of water and 20 ml of 10 percent aqueous gelatin with vigorous stirring. 0.5 g of p-methylaminophenol and 1.5 ml of 10 percent aqueous saponin solution are then added. A web of paper is coated with the final solution. After drying, a pale yellow layer is obtained which is colored a blackish blue-green on exposure to light.

EXAMPLE 4

0.3 g of Phthalogenbrillantblau IF 3 GM (Trade product of Farbenfabriken Bayer AG - CI S440) are dissolved in 20 ml of 50 percent aqueous methanol. The solution is then stirred into 30 ml of 10 percent aqueous gelatin at 40°C. 10 ml of a 10 percent aqueous polyvinyl pyrrolidone solution are added. 0.1 g of Phthalogenblauschwarz IVM (Trade product of Farbenfabriken Bayer AG - CI S 440) dissolved in 10 ml of methanol are stirred in. This solution mixture is added to a solution of 0.5 g of sodium tetraphenylboranate in 10 ml and 20 ml of 10 percent aqueous gelatin, respectively. After the addition of 1.5 ml of 10 percent saponin solution, this mixture is made up to 120 ml and paper of card thickness is coated with it. The pale yellow light is colored grey-brown on exposure to light.

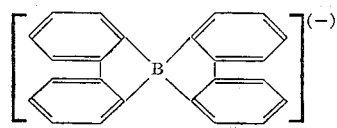

I claim:

1. In a light-sensitive photographic layer containing a light-sensitive leucophthalocyanine, the improvement according to which the light sensitivity of the layer is increased by combining the leucophthalocyanine with a phenyl boranate, having the formula:

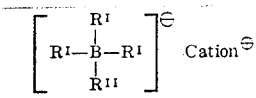

wherein
R$'$ = aryl selected from the group consisting of phenyl and naphthyl, which aryl group may be substituted with alkyl groups having up to five C atoms, halogen, hydroxyl, alkoxy, carboxyl, esterified carboxyl, nitro, nitrile, carbamoyl, sulfonic acid, sulfonamide or sulfonic acid ester groups,
R$''$ = nitrile or R$'$.

2. The combination of claim 1 in which the leucophthalocyanine is a cobalt leucophthalocyanine.

3. The combination of claim 1 in which the leucophthalocyanine and the phenylboranate are in a proportion of from 1:1 to 1:2.

4. A light-sensitive photographic layer as claimed in claim 1, wherein the boron compound anion is of the following formula: